United States Patent [19]
Wolf

[11] Patent Number: 5,970,247
[45] Date of Patent: Oct. 19, 1999

[54] METHODS FOR ENCODING DECODING AND PROCESSING SIX CHARACTER DATE DESIGNATIONS FOR THE YEAR 2000 AND BEYOND

[76] Inventor: William M. Wolf, One Longbranch Ave., Rockport, Mass. 01966

[21] Appl. No.: 08/946,456

[22] Filed: Oct. 7, 1997

Related U.S. Application Data

[60] Provisional application No. 60/027,554, Oct. 7, 1996, provisional application No. 60/031,764, Nov. 26, 1996, provisional application No. 60/031,768, Nov. 26, 1996, provisional application No. 60/031,766, Nov. 26, 1996, provisional application No. 60/031,765, Nov. 26, 1996, provisional application No. 60/031,490, Nov. 26, 1996, and provisional application No. 60/049,896, Jun. 17, 1996.

[51] Int. Cl.$^6$ .............................. G06F 9/44; G06F 17/00
[52] U.S. Cl. ............................................ 395/704; 707/101
[58] Field of Search ............... 341/81–86; 364/768–771; 368/10, 28–30, 41–43; 395/701–703, 705, 704; 707/1, 6, 100–102, 104

[56] References Cited

U.S. PATENT DOCUMENTS 5,062,042  10/1991  Binkley et al. .
5,261,065  11/1993  Urabe et al. .

(List continued on next page.)

OTHER PUBLICATIONS

Lips, "Six–Digit Dates and the Century Change", Enterprise Systems Journal, Oct. 1993, pp. 68–72, 101.
Zvegintzov, "The Year 2000 as Racket and Ruse", American Programmer, pp. 17–19, Feb. 1996.
Butler, "2000: The Year of Judgement", Managing System Development, pp. 1–7, Jun. 1995.
Eldridge, "A Comparison of Procedural and Data Change Options for Century Compliance", pp. 1–6, http://www.year2000.com.
Liang et al., "Techniques for Addressing the Year 2000 transition", IEEE, pp. 444–447, 1997.
McCabe, "Cyclomatic Complexity and the Year 2000", IEEE Software, pp. 115–117, 1996.
Hart et al., "A Scaleable, Automated Process for Year 2000 System Correction", IEEE Software, pp. 475–484, 1996.
Martin, "Dealing with Dates: Solutions for the Year 2000", Computer, pp. 44–51, Mar. 1997.

*Primary Examiner*—Tariq R. Hafiz
*Assistant Examiner*—Kakali Chaki
*Attorney, Agent, or Firm*—David J. Powsner; Choate, Hall & Stewart

[57] ABSTRACT

A method of encoding and decoding calendar dates in multiple centuries to allow date data to be stored in a six-character format in a digital data processor. In an embodiment designed to allow existing programs to process date data correctly in the year 2000 and beyond, dates occurring before the year 2000 are characterized by two digit representations of each of the day, month, and year, while dates in the year 2000 and years thereafter are characterized by a year representation of "99" and a four-character month/day representation which is greater than 1231.

The method comprises an Input Phase, in which date data are encoded from a conventional form into a six character format suitable for storage in a digital data processor, a Processing Phase, in which arithmetic and logical manipulation of date data may be performed, and an Output Phase, in which encoded date data are decoded into conventional numerical date designations.

Also disclosed is a method of modifying existing computer programs to allow processing of dates in multiple centuries according to the above method.

11 Claims, 5 Drawing Sheets

U.S. PATENT DOCUMENTS

| | | |
|---|---|---|
| 5,283,895 | 2/1994 | Kashio et al. . |
| 5,297,280 | 3/1994 | Potts et al. . |
| 5,317,736 | 5/1994 | Bowen . |
| 5,355,472 | 10/1994 | Lewis . |
| 5,379,366 | 1/1995 | Noyes . |
| 5,388,255 | 2/1995 | Pytlik et al. . |
| 5,404,520 | 4/1995 | Sonobe . |
| 5,410,704 | 4/1995 | Norden-Paul et al. . |
| 5,414,843 | 5/1995 | Nakamura et al. . |
| 5,418,942 | 5/1995 | Krawchuk et al. . |
| 5,426,760 | 6/1995 | Moreland . |
| 5,432,930 | 7/1995 | Song . |
| 5,457,792 | 10/1995 | Virgil . |
| 5,457,795 | 10/1995 | Willman . |
| 5,465,365 | 11/1995 | Winterbottom . |
| 5,497,319 | 3/1996 | Chong et al. . |
| 5,504,852 | 4/1996 | Thompson-Rohrlich . |
| 5,504,884 | 4/1996 | Kyuma et al. . |
| 5,504,891 | 4/1996 | Motoyama et al. . |
| 5,504,906 | 4/1996 | Lutoff . |
| 5,513,305 | 4/1996 | Maghbouleh . |
| 5,513,306 | 4/1996 | Mills et al. . |
| 5,513,351 | 4/1996 | Grantz . |
| 5,555,417 | 9/1996 | Odnert et al. . |
| 5,586,329 | 12/1996 | Knudsen et al. . |
| 5,586,330 | 12/1996 | Knudsen et al. . |
| 5,600,836 | 2/1997 | Alter . |
| 5,628,017 | 5/1997 | Kimmerly et al. . |
| 5,630,118 | 5/1997 | Shaughnessy . |
| 5,640,550 | 6/1997 | Coker . |
| 5,640,567 | 6/1997 | Phipps . |
| 5,642,521 | 6/1997 | Kiuchi et al. . |
| 5,644,762 | 7/1997 | Soeder ................................. 395/606 |
| 5,719,826 | 2/1998 | Lips ........................................ 368/29 |
| 5,761,668 | 6/1998 | Adamchich ........................... 707/101 |
| 5,797,117 | 8/1998 | Gregovich ............................. 707/101 |
| 5,808,889 | 9/1998 | Burgess ................................ 364/737 |
| 5,845,286 | 12/1998 | Calizza ................................. 707/101 |

METHODS FOR ENCODING DECODING AND PROCESSING SIX CHARACTER DATE DESIGNATIONS FOR THE YEAR 2000 AND BEYOND

REFERENCE TO RELATED APPLICATIONS

This application claims the benefit of U.S. Provisional Patent Application Ser. No. 60/027,554, filed Oct. 7, 1996, and of 60/031,764, filed Nov. 26, 1996, and of U.S. Provisional Patent Application Ser. No. 60/031,768, filed Nov. 26, 1996, and of U.S. Provisional Patent Application Ser. No. 60/031,766, filed Nov. 26, 1996, and of U.S. Provisional Patent Application Ser. No. 60/031,765, filed Nov. 26, 1996, and of U.S. Provisional Patent Application Ser. No. 60/031,490, filed Nov. 26, 1996, and of U.S. Provisional Patent Application Ser. No. 60/049,896, filed Jun. 17, 1997.

BACKGROUND OF THE INVENTION

The modern electronic digital computer traces its origin to the 1950s with the large scale computers first built at universities and government laboratories, then produced by industry for commercial installations world-wide. As computers proliferated, their applications covered the spectrum from relatively mundane payroll processing to sophisticated on-line reservation systems. Today our modern society has become so dependent upon computers that it is almost impossible to function without interfacing with a computer.

It is essential, of course, that these computers be properly and correctly programmed. The literature contains several examples of the chaos with results when the computer is misprogrammed. On-line systems from stock exchanges to race tracks have halted operations until the program, or the computer, is repaired. As computer hardware has increased in reliability and typical programs have increased in size, the majority of these system malfunctions can be attributed to software errors.

As is well known, the operations of the digital computer are based upon the binary number system. Arabic numerals and alphabetic characters are stored in digital form as a series of binary digits. Several standards have been developed to ensure that all computers use the same configuration of binary digits to represent the corresponding characters. In large mainframe computers, particularly, those manufactured by IBM, the most common standard is called the Extended Binary Coded Decimal Interchange Code, better known by its acronym, EBCDIC. In most other computers the standard is the American Standard Code for Information Exchange or ASCII.

In the early days of the development of digital computers, data storage was expensive and scarce. It was thus considered useful to compress data whenever practical. One common technique for conserving storage space was to assume that the year in any given date fell within the twentieth century, and to represent that year only by its two terminal digits, dropping the initial "19". This also presented a certain symmetry in that two digits represented the month (sometimes referred to as MM), two digits represented the day (sometimes referred to as DD), and two digits represented the year (sometimes referred to as YY). A date would typically then be stored in the computer as YYMMDD.

As we approach the twenty-first century, it is no longer appropriate to assume that a computer will never have to store a representation of a date outside of the range from 1900–1999. It might seem at first glance that this fact would not require a change in storage mechanisms, since it is unlikely that a program would routinely have to deal with years in the twentieth and twenty-first centuries which have the same two terminal digits. For example, it is unlikely that a airline reservations program which must schedule reservations for 2040 would contain any data regarding flights in 1940. However, problems arise when mathematical manipulation of dates must be performed.

When it could be safely assumed that all dates in a computer program occurred in the 1900s, mathematical manipulation of dates in six-digit format was fairly straightforward. For example, if a subtraction to find the time between two dates was required, $$\begin{array}{rr} \text{January 1, 1973 represented by} & 730101 \\ \text{minus January 1, 1969 represented by} & \underline{-690101} \\ \text{gave the correct answer,} & 040000 \text{ (or 4 years)} \end{array}$$

For operations involving years after 1999, however, this simple operation is no longer appropriate. For example, $$\begin{array}{rr} \text{January 1, 2003 represented by} & 030101 \\ \text{minus January 1, 1999 represented by} & \underline{-990101} \\ \text{gives the incorrect answer,} & -960000 \text{ (or }-96 \text{ years!)} \end{array}$$

The obvious solution to this difficulty is to carry four year digits, rather than two. However, it is not as easy as it might seem to effect this change, even though digital storage is now sufficiently inexpensive that the overhead for carrying four digits instead of two is minimal. The only certain way to make such a program change is to inspect each program, line by line, to determine if the date is employed in the operation of that routine and to modify the program accordingly. After modification, the program must then be thoroughly tested under a variety of circumstances to assure that making the modification did not affect some other part of the system. This process is expensive and time-consuming. Expert estimates have placed the cost in the neighborhood of $1 to $8 per line. In any modern computer center where many programs have been written and rewritten over the past four decades, this cost is extremely high.

As Jan. 1, 2000 approaches, this problem becomes increasingly urgent. A shortage of trained computer programmers further exacerbates the situation, making it difficult or impossible to perform such extensive modifications on all the systems in operation today.

In view of the foregoing, an object of the invention is to provide improved methods of digital data processing and, particularly, improved methods for processing dates in multiple centuries.

More particularly, an object of the invention is to provide methods that can be readily incorporated into existing computer programs, and that can be used for encoding, decoding, storing, accessing and/or processing dates in multiple centuries.

A further object of the invention is to provide such methods as do not require substantial modifications to existing data structures or source code.

SUMMARY OF THE INVENTION

The foregoing objects are among those attained by the invention, which provides improved methods for encoding (and decoding) calendar dates in multiple centuries, as sequences of six characters. The method is applicable, for example, in digital data processing systems of the type in which years are represented as a sequence of two decimal digits. The method is particularly characterized by its use of non-numeric characters, or of four-digit numbers greater than 1231, to represent the month and day in dates in and after a specified year, e.g., the year 2000.

Accordingly, one aspect of the invention provides a method for encoding a calendar year, month, and day as three sequences, each of two characters, by, first, determining whether the year is prior to the specified year. If so, the method generates a two-character sequence representing that year, where those characters are the final digits of the year, a two-character sequence representing the month, where the characters are two digits defining a number from 01 to 12, and a two-character sequence representing the day, where the characters are two digits defining a number from 01 to 31. If not, the method generates the sequence "99" to represent the year, and generates a sequence of four characters representing the month and day, where either (i) the four characters are decimal digits defining a number in the range "1232" to "9999", or (ii) at least one of the four characters is non-numeric.

For example, a method according to this aspect of the invention encodes years in the range 1900–1999 as the sequences 00–99, respectively. Months in these years are encoded as the sequences 01–12, and days as the sequences from 01–31. Years in the range 2000–2010, on the other hand, are encoded as the sequence "99," and the corresponding days in these years are encoded as the respective sequences "1232"–"5249".

In related aspects, the invention provides methods as described above in which the four-character sequences representing days in the year 2000, and beyond, are determined from a lookup table. In an alternative aspect, those sequences can be determined by calculating the appropriate character sequence using the numeric values of the corresponding year, month, and day.

Further aspects of the invention provides methods as described above in which the character sequences are composed of ASCII characters, or in which they are composed of EBCDIC characters.

In yet still further aspects, the invention provides methods as described above in which the two-character sequences representing the day, month and year, respectively, are stored in a memory unit (e.g., RAM disk drive, or magnetic tape) associated with the digital data processor.

Other aspects of the invention are directed to methods for decoding two-character sequences to identify calendar years, months, and days represented thereby, including the year 2000 and beyond. In this aspect, the method calls for examining a sequence of two characters corresponding to a year to determine whether it is equal to "99." If not, the numeric value of the calendar year is generated by adding 1900 to the numeric value of the sequence. If so, the numeric value of the calendar year is generated (i) from a lookup table, where the four character sequence representing the month and day serves as an index to that table, or (ii) by mapping the four-character sequence representing the day into three numeric values (e.g., in the ranges 00–99, 01–12, and 01–31 respectively) and adding one of those values to a base value, e.g., 2000, to obtain numeric values representing the year, month, and day.

Related aspects of the invention provide methods for processing calendar dates in a digital data processor of the type in which calendar dates are represented by six-character sequences stored in memory units associated with the digital data processor. The method includes retrieving a six-character sequence from such memory unit and decoding it as described above.

These and other aspects of the invention are evident in the drawings and in the description that follows.

By "decimal digit," as that term is used herein, it is meant a member of the group of characters consisting of "1", "2", "3", "4", "5", "6", "7", "8", "9" and "0."

By "numeric character," as that term is used herein, it is meant a character that is a decimal digit.

By "non-numeric character," as that term is used herein, it is meant a character that is not a decimal digit.

By "compiler," as that term is used herein, it is meant a computer program that is adapted to convert high-level language source instructions into machine code, regardless of at what time such conversion occurs. In particular, the term "compiler" includes programs which convert source instructions to machine code at run time, often referred to in the art as "interpreters."

When "greater than" or "less than" are used herein in connection with comparing sequences of characters, all sequences containing non-numeric characters are considered to be greater than sequences containing only numeric characters.

DETAILED DESCRIPTION

Figure 1:
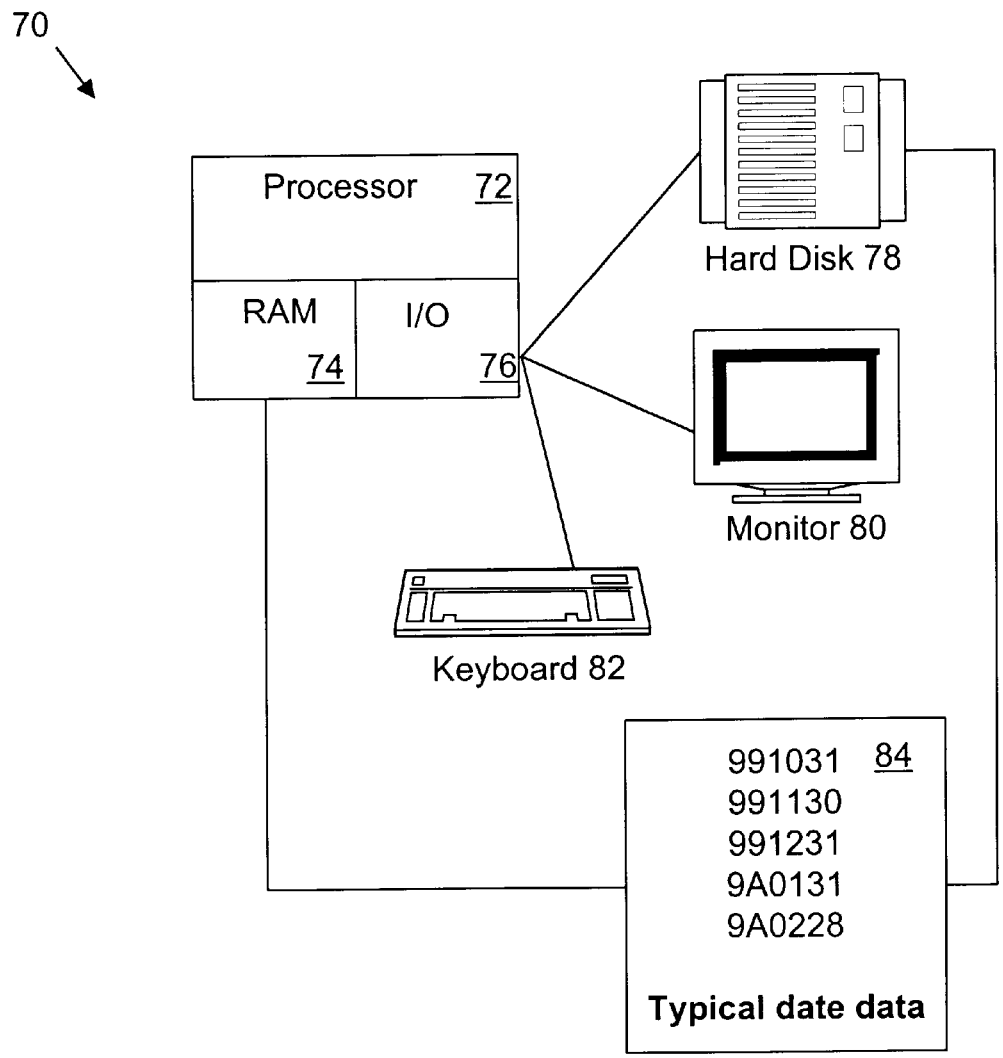
FIG. 1 portrays a digital data processing system of the type used to practice the invention that stores dates as sequences of six characters.

FIG. 1 portrays a digital data processing system 70 of the type employed to practice the invention. The system comprises the standard components of most desktop or mainframe computers: a central processing unit (Processor, or CPU) 72, a monitor 80 or other output device (not shown), and persistent storage means, such as a floppy disk drive (not shown), a hard disk drive 78, a tape drive (not shown), etc. The CPU generally comprises an area of random access memory (RAM) 74, where program instructions and data are stored. Date data 84 in the form of six digit character sequences (e.g., "991031" . . . "9A0228") will generally be stored in at least one of the RAM and any persistent storage means.

Figure 2:
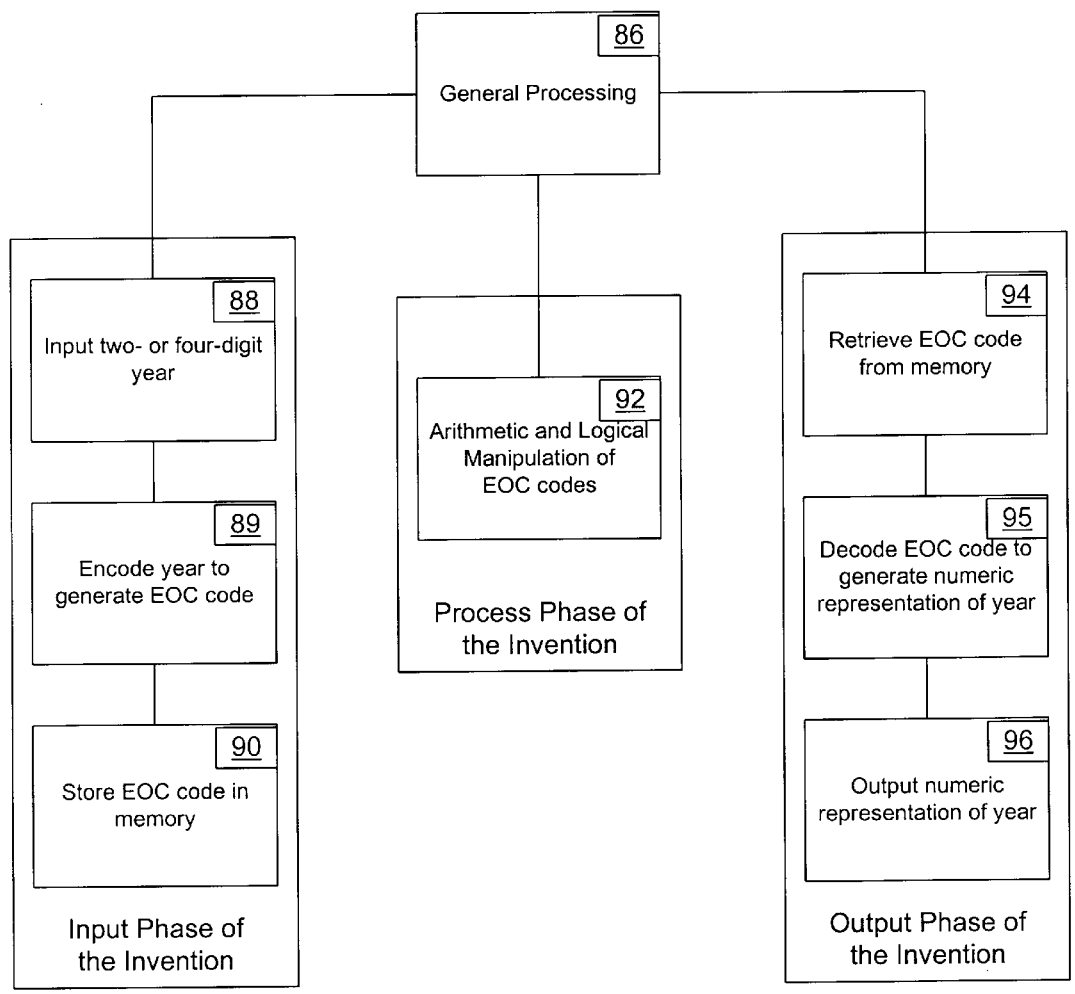
FIG. 2 is a flow-chart overviewing a digital data processor operating in accordance with the invention comprising an Input Phase, a Processing Phase, and an Output Phase.

A computer program written in accordance with the invention comprises three parts, as shown in FIG. 2. These parts consist of an Input Phase, a Process Phase, and an Output Phase. In the Input Phase, date information is acquired from the user or other external source, and is encoded for storage in a six-character date field. The Process Phase includes all internal arithmetic and logical manipulation of date data. In the Output Phase, date data encoded according to the method of the invention are decoded into a user-readable form.

The invention is detailed below in terms of an embodiment in which a computer program encodes and decodes dates subsequent to 1999, but it will be recognized that other criteria may be specified for which dates should be encoded and decoded.

Input Phase

Figure 3:
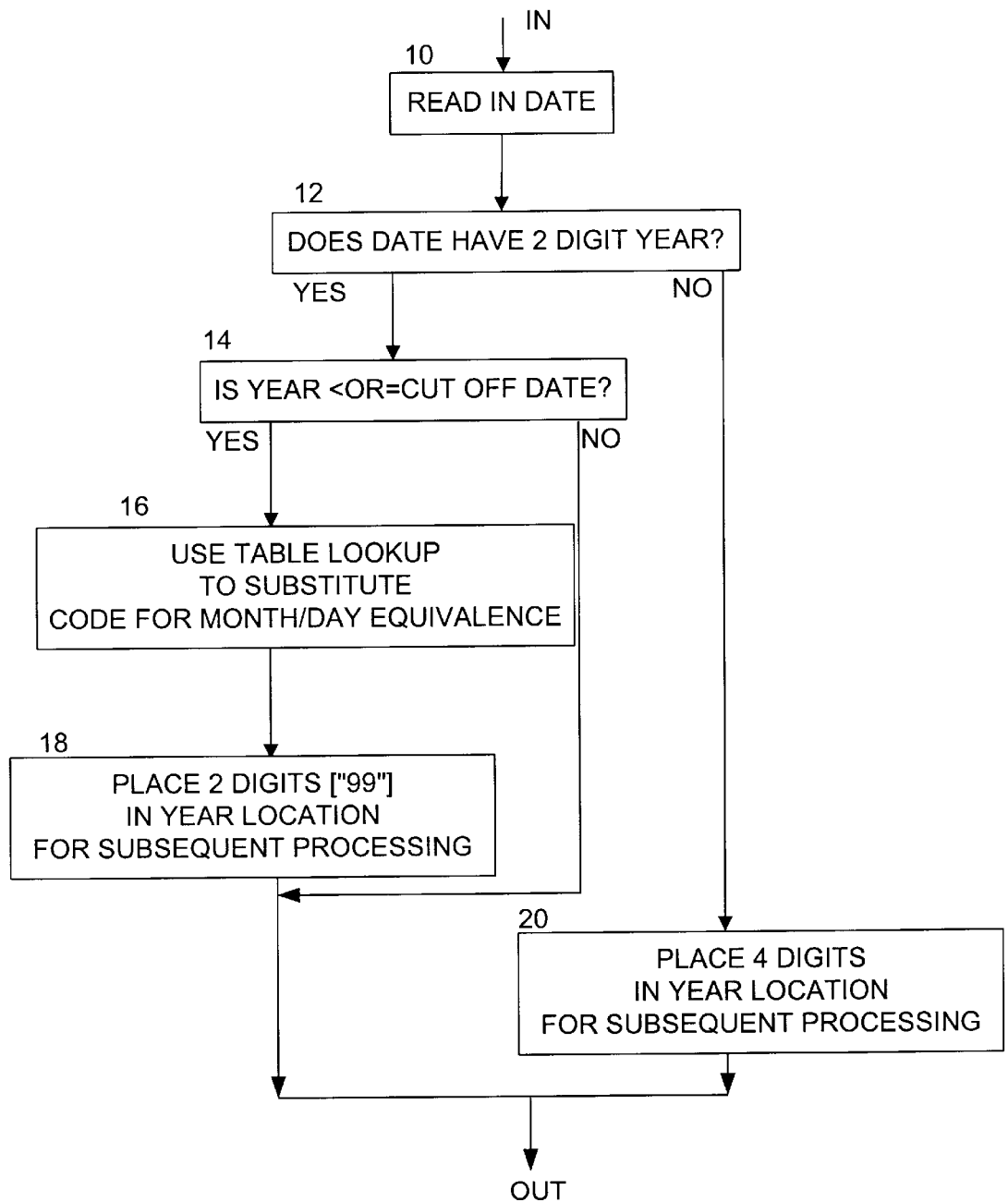
FIG. 3 is a flow-chart representing the Input Phase of a digital data processor according to the invention.

Focusing on the Input Phase, the general encoding procedure of the Input part of the invention is portrayed in the Flow Diagram of FIG. 3. The first step (Block 10) is to read in to the working memory of the computer the data to be processed including the data representing the year. In the next step (Block 12) it is determined whether or not the annual part of the calendar date is represented by two or four decimal digits. If the representation has four digits, control proceeds to Block 20 wherein the four digits are placed in the proper year location for subsequent processing.

If the annual date is specified by two digits, control proceeds to Block 14 where a determination is made as to whether or not the two digit year is less than or equal to an arbitrarily determined cut off date. This cut off date will depend upon the range of activities described by the program application. If, for example, the program is a current payroll processing routine, it would be appropriate to set the cut off date at some number such as 01 (representing the year 2001) or 04 (representing the year 2004) or more. This cut off date could be moved forward as time goes by. The reason for employing a cut off date is to differentiate between an activity happening in the year 1997, for example, from the year 2097. It is a safety feature built into the method to cover extreme cases which would not arise in most applications.

Progressing beyond the cut off date test, the method, in Block 16, employs a table look up procedure, common in the profession, to substitute the two character alphanumeric codes for the month and day as may be seen in Table 1. In this procedure, an area of memory of the digital data processor contains paired sets of (i) two- or four-digit years, two digit months, and two-digit days, and (ii) four character month/day codes, so that a particular year/month/day combination may be found in the memory, and its location will allow the processor to find the corresponding alphanumeric month and day codes.

Alternatively, in an embodiment not shown, Block 16 may be replaced with a procedure for calculating the alphanumeric code given the four digit year and two digit month. It will be apparent to those skilled in the art how such calculation can be accomplished for many possible coding systems, including but not limited to that depicted in Table 1.

The yearly code of "99" is substituted for use in subsequent processing (Block 18).

Control then passes out of this Input Phase.

Process Phase

Figure 4:
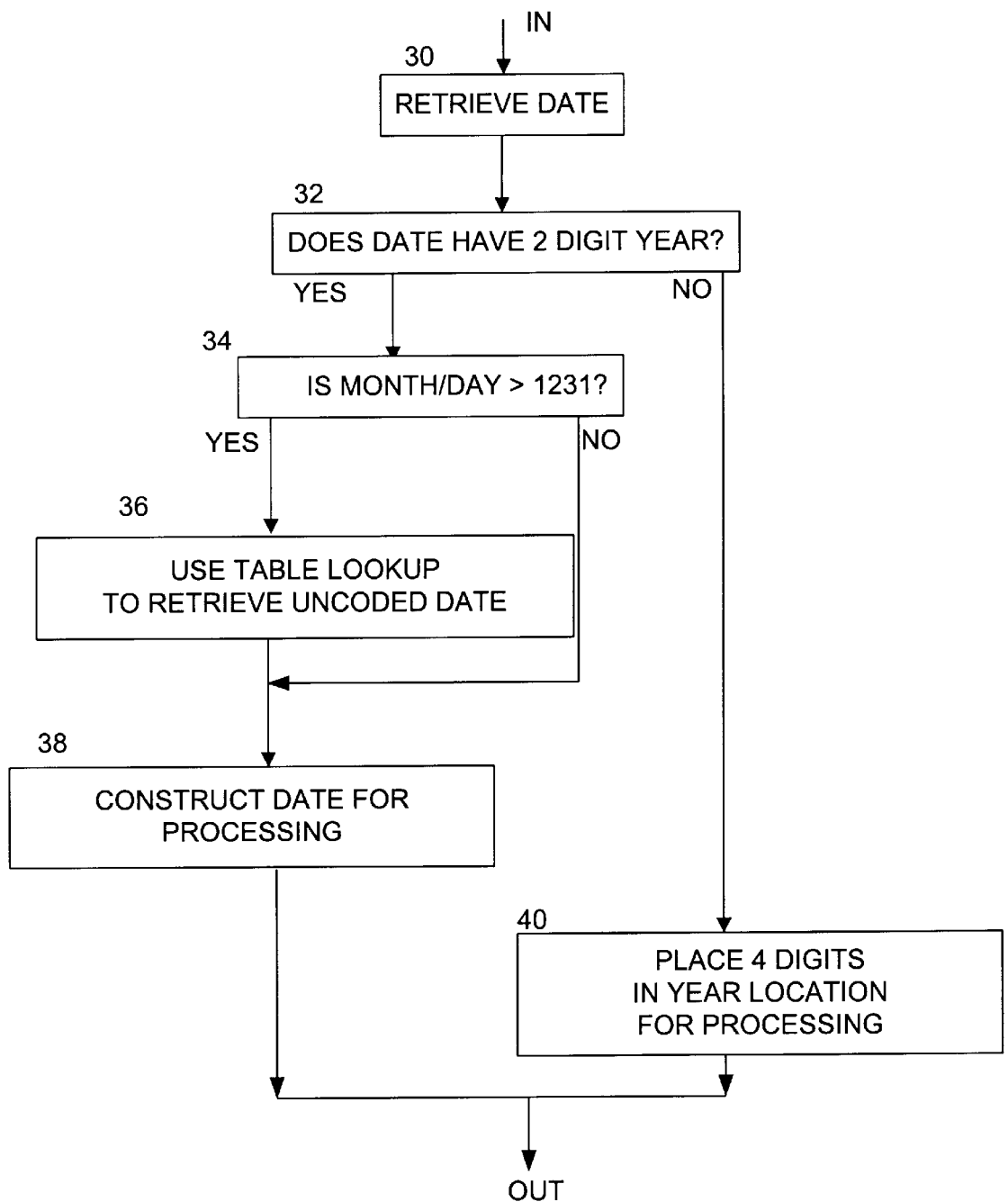
FIG. 4 is a flow-chart representing the Process Phase of a digital data processor according to the invention.

The Process Phase is portrayed by the flow diagram of FIG. 4. The first step to be taken in the date part of the process is to retrieve the coded date (Block 30).

In the next step (Block 32) it is determined whether or not the annual part of the calendar date is represented by two or four decimal digits. If the representation has four digits, control proceeds to Block 40 wherein the four digits are placed in the proper year location for processing.

The next question asked (Block 34) is whether or not the month/day part of the date is greater than 1231, where any month/day part containing a non-numeric character is considered to be greater than 1231. If not, the date is earlier than Jan. 1, 2000 and the date is not coded, according to this method. If the month/day is greater than 1231, this signifies a coded date which must be interpreted. This is done in Block 36. Following this retrieval, the date must be constructed for processing (Block 38). The method of this construction depends upon the program process which has been previously programmed. The constructed date will conform to that specification.

Control then passes out of this date preparation process.

After processing in accordance with the previously programmed routine the date data may be recorded employing the Input program described above.

In this regard, it is recognized in the art that arithmetic operations on six character dates (in which years are represented by two characters) or eight character dates (in which years are represented by four characters) must account for the modulus and length of each sub-field (e.g., each two-character day, two-character month and two-character year). For example, as illustrated below, adding one day to Jan. 31, 1997, must result in Feb. 1, 1997, not Jan. 31, 1997:

```
970131 (January 31, 1997)
000001 (one day)
------
970201 (February 1, 1997)
```

Techniques for assuring that the moduli of sub-fields are correctly treated are well- known in the art, and hence are not detailed herein.

Output Phase

Figure 5:
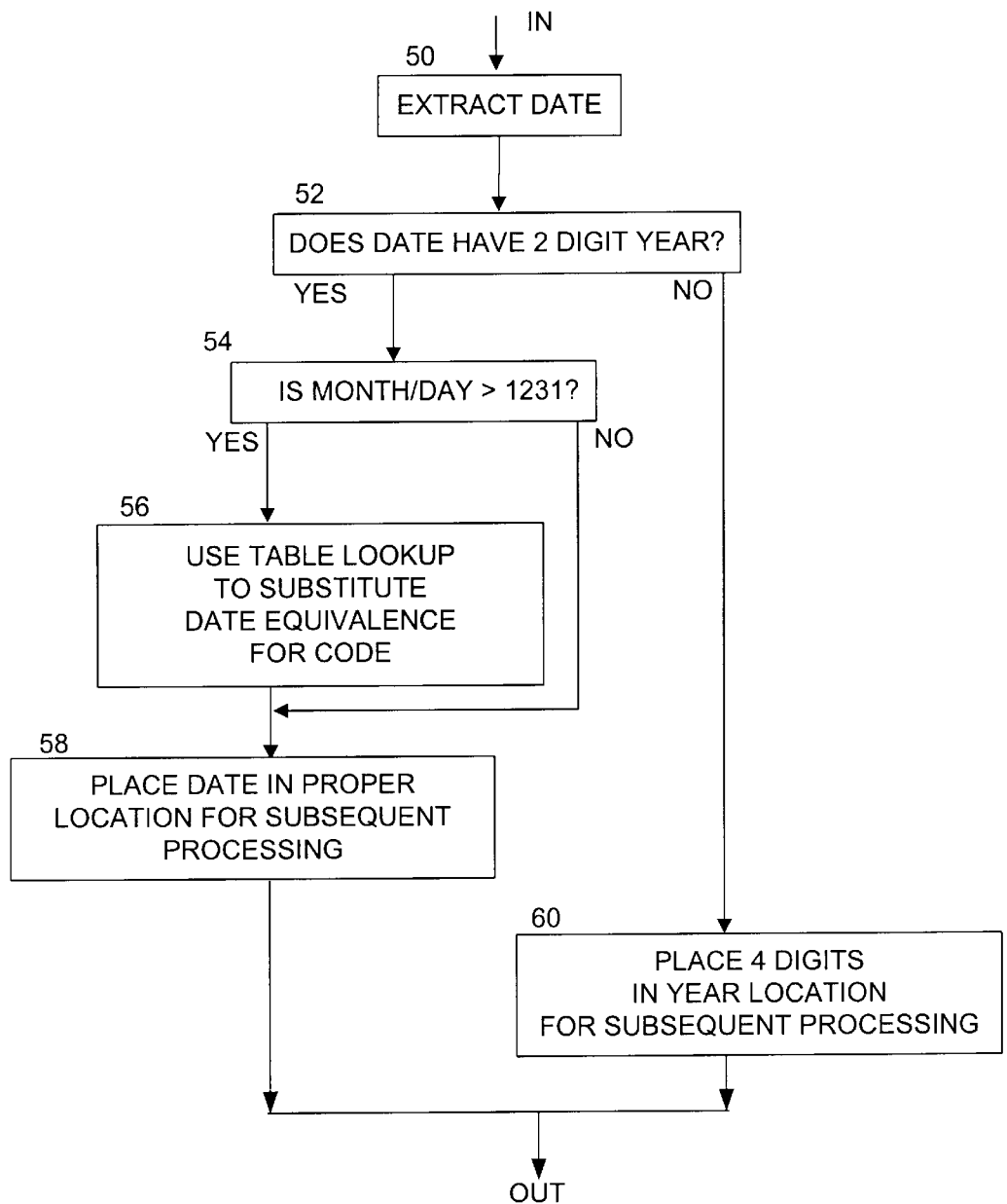
FIG. 5 is a flow-chart representing the Output Phase of a digital data processor according to the invention.

Prior to output processing such as printing or displaying on a monitor, a decoding procedure is performed as illustrated in the Output Flow Diagram of FIG. 5.

The date data are extracted (Block 50) for Output processing. A determination is made (Block 52) as to whether the date has a two digit year.

If not, control passes to Block 60 where the four year digits are placed in their appropriate location and control passes out of the routine.

If there are two digits representing the year the determination is made (Block 54) as to whether or not the coded month/day is greater than 1231. As in the Process Phase, any month/day part containing a non-numeric character is considered to be greater than 1231.

If not, the two digit year represents a date in the 1900s and those two digits are stored for subsequent processing, Block 58.

If the coded month/day is greater than 1231, control passes to Block 56 wherein a table look up routine is employed to substitute the proper date equivalent. This table look up is the converse of the one employed in the Input routine.

Control is then passed to Block 58, where the date data are placed in the proper location for subsequent processing.

Control then passes out of this routine.

TABLE 1

| CALENDAR YEAR | TWO-DIGIT YEAR | FOUR-DIGIT MONTH/DAY | ENCODED YEAR | ENCODED MONTH/DAY |
|---|---|---|---|---|
| 1900 | 00 | 0101–1231 | 00 | 0101–1231 |
| 1901 | 01 | 0101–1231 | 01 | 0101–1231 |
| . | . | . | . | . |
| . | . | . | . | . |
| . | . | . | . | . |
| 1999 | 99 | 0101–1231 | 99 | 0101–1231 |
| 2000 | 00 | 0101 | 99 | 1232 |
|  | 00 | 0102 | 99 | 1233 |
| . | . | . | . | . |
| . | . | . | . | . |

TABLE 1-continued

| CALENDAR YEAR | TWO-DIGIT YEAR | FOUR-DIGIT MONTH/DAY | ENCODED YEAR | ENCODED MONTH/DAY |
|---|---|---|---|---|
| | 00 | 0131 | 99 | 1262 |
| | 00 | 0201 | 99 | 1263 |
| . | . | . | . | . |
| . | . | . | . | . |
| . | . | . | . | . |
| | 00 | 1231 | 99 | 1597 |
| 2001 | 01 | 0101 | 99 | 1598 |
| . | . | . | . | . |
| . | . | . | . | . |
| . | . | . | . | . |
| | 01 | 1231 | 99 | 1962 |
| 2002 | 02 | 0101–1231 | 99 | 1963–2327 |
| 2003 | 03 | 0101–1231 | 99 | 2328–2692 |
| 2004 | 04 | 0101–1231 | 99 | 2693–3058 |
| 2005 | 05 | 0101–1231 | 99 | 3059–3423 |
| 2006 | 06 | 0101–1231 | 99 | 3424–3788 |
| 2007 | 07 | 0101–1231 | 99 | 3789–4153 |
| 2008 | 08 | 0101–1231 | 99 | 4154–4519 |
| 2009 | 09 | 0101–1231 | 99 | 4520–4884 |
| 2010 | 10 | 0101–1231 | 99 | 4885–5249 |
| . | . | . | . | . |
| . | . | . | . | . |
| . | . | . | . | . |
| 2023 | 23 | 0101–1231 | 99 | 9633–9997 |
| 2024 | 24 | 0101 | 99 | 9998 |
| | 24 | 0102 | 99 | 9999 |
| | 24 | 0103 | 99 | 999A |
| | 24 | 0104 | 99 | 999B |
| . | . | . | . | . |
| . | . | . | . | . |
| . | . | . | . | . |
| | 24 | 0128 | 99 | 999Z |
| | 24 | 0129 | 99 | 99A0 |
| | 24 | 0130 | 99 | 99A1 |
| | 24 | 0131 | 99 | 99A2 |
| | 24 | 0201–1231 | 99 | 99A3–99MP |
| . | . | . | . | . |
| . | . | . | . | . |
| . | . | . | . | . |
| 2099 | 99 | 1231 | 99 | 9VAI |

While the invention has been particularly described with reference to the preferred embodiment thereof, it will be understood by those skilled in the art that various changes in substance and form can be made therein without having departed from the spirit and scope of this invention as detailed in the attached claims. Thus, for example, although the examples above utilize the Year 2000 as a cut-off, those skilled in the art will appreciate that other years could be utilized instead, e.g., 2001, 2002, etc.

What is claimed is:

1. A computer-implemented method for encoding a calendar date in a format suitable for a digital data processor of the type that stores calendar dates in memory adapted for holding a sequence of six characters, the method comprising the steps of
    (a) determining whether the calendar year is prior to the year 2000,
    (b) responding to the calendar year being prior to the year 2000, for generating a sequence of six characters representing the calendar year, where the first two characters represent the final two digits of the year, the third and fourth characters represent a number between 01 and 12 inclusive indicating the month, and the final two characters represent a number between 01 and 31 inclusive indicating the day,
    (c) responding to the calendar year being or being after the year 2000, for generating a sequence of six characters representing the calendar date, where the first two characters of the sequence are 99, and the last four characters are one of the group consisting of
        (i) four digits having a numeric value in the range from 1232 to 9999 inclusive, or
        (ii) four characters, at least one of which is non-numeric.

2. The method of claim 1 wherein the character sequence is composed of ASCII characters.

3. The method of claim 1 wherein the character sequence is composed of EBCDIC characters.

4. The method of claim 1 wherein numeric characters in the character sequence are represented by their binary equivalents.

5. The method of claim 1, further comprising an initial step of
    (a) inputting a calendar date to be stored in a digital data processor, and a final step of
    (b) storing a six-character code determined according to the method of claim 1 in a region of the memory of the digital data processor which is adapted to store six characters of data.

6. The method of claim 1, wherein the calendar year is in a two-digit format, and step (a) comprises the steps of
    (i) comparing a two-digit representation of the calendar year to a cutoff date,
    (ii) responding to a determination that the two-digit representation is less than or equal to the cutoff date for determining that the year is or is after 2000, and
    (iii) responding to a determination that the two-digit representation is greater than the cutoff date for determining that the year is before 2000.

7. A computer-implemented method for decoding a calendar date from a format suitable for a digital data processor of the type that stores such combinations in memory adapted for holding a sequence of six characters, the method comprising the steps of
    (a) examining a sequence of six characters to determine whether the first two digits are equal to 99, and if so, whether the last four characters are one of the group consisting of
        (i) four digits in the range from 1232 to 9999 inclusive, and
        (ii) four characters, at least one of which is non-numeric,
    (b) responding to a negative determination in step (a) for generating a four-digit number representing a calendar year, in which the first two digits are 19 and the second two digits are the first two digits of the sequence, generating a two-digit number representing a calendar month, in which the month is represented by the third and fourth digits of the sequence, and generating a two-digit number representing a calendar day, in which the day is represented by the final two digits of the sequence,
    (c) responding to a positive determination in step (a) for generating a four-digit number representing a calendar year, said number being greater than 1999, for generating a two-digit number representing a calendar month, which number is between 01 and 12 inclusive, and for generating a two-digit number representing a calendar day, which number is between 01 and 31 inclusive.

8. The method of claim 7 wherein the character sequence is composed of ASCII characters.

9. The method of claim 7 wherein the character sequence is composed of EBCDIC characters.

10. The method of claim 7 wherein numeric characters in the character sequence are represented by their binary equivalents.

11. The method of claim 7, further comprising an initial step of
   (a) retrieving from the memory of a digital data processor a six-character code representing a calendar date, and a final step of
   (b) outputting at least a portion of the four-digit number representing the year and of the two-digit numbers representing the month and day as determined by the method of claim 7.

* * * * *

UNITED STATES PATENT AND TRADEMARK OFFICE
CERTIFICATE OF CORRECTION

PATENT NO. : 5,970,247
DATED : October 19, 1999
INVENTOR(S) : William M. Wolf

It is certified that error appears in the above-identified patent and that said Letters Patent is hereby corrected as shown below:

Page 2, before line 1: please insert
--5,062,042   10/1991   Binkley et al--
--5,261,065   11/1993   Urabe et al--

Col 6, line 15: please delete "Jan. 31,"; and insert therefor --Jan. 32,--

Signed and Sealed this

Second Day of May, 2000

Attest:

Q. TODD DICKINSON

*Attesting Officer*                       *Director of Patents and Trademarks*